(No Model.)
J. NEWMAN.
WASHING MACHINE.
No. 298,613. Patented May 13, 1884.
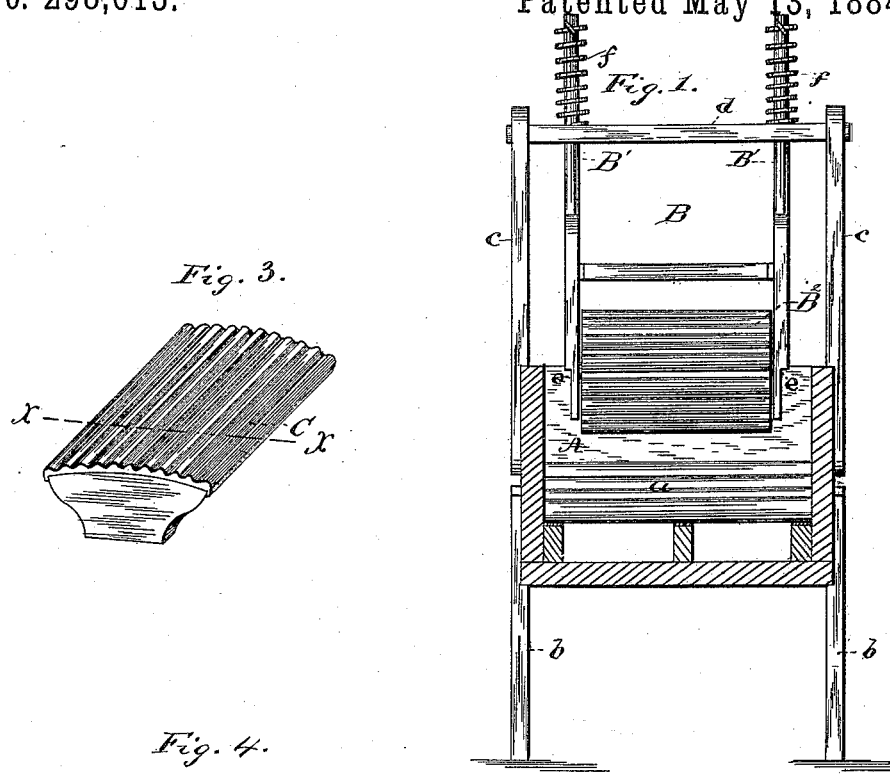
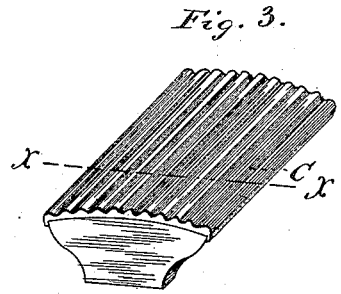
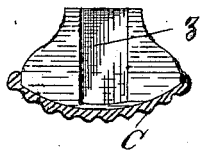
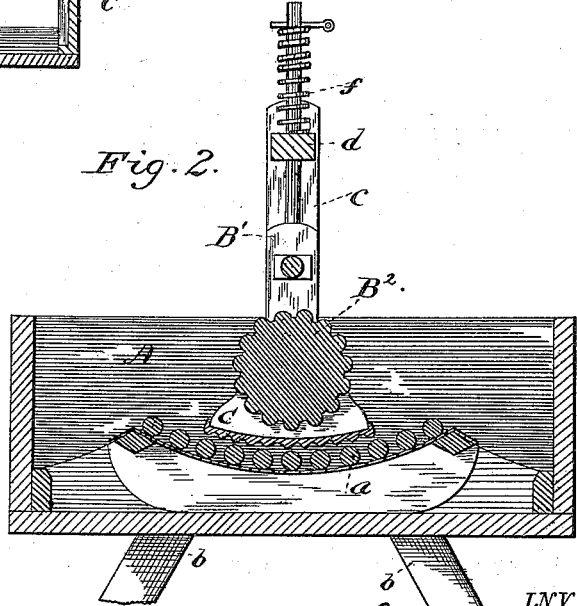
WITNESSES
Chas. R. Burr
W. E. Bowen
INVENTOR
Jesse Newman
By Myers & Co.
Attorneys
N. PETERS, Photo-Lithographer, Washington, D. C.

UNITED STATES PATENT OFFICE.

JESSE NEWMAN, OF ATLANTA, ILLINOIS.

WASHING-MACHINE.

SPECIFICATION forming part of Letters Patent No. 298,613, dated May 13, 1884.

Application filed August 6, 1883. (No model.)

*To all whom it may concern:*

Be it known that I, JESSE NEWMAN, a citizen of the United States of America, residing at Atlanta, in the county of Logan and State of Illinois, have invented certain new and useful Improvements in Washing-Machines, of which the following is a specification, reference being had therein to the accompanying drawings.

This invention pertains to improvements in washing-machines, having mainly for its object to provide for the washing of light and heavy clothing; and it consists, therefore, of the adaptability of the rubber to that end by the employment of a supplementary or auxiliary rubber readily applicable to and removable from the principal rubber, substantially as hereinafter more fully set forth and claimed.

In the accompanying drawings, Figure 1 is a longitudinal section (with the supplementary rubber removed to one side) of my washing-machine. Fig. 2 is a similar view therefor with the supplementary rubber in position. Fig. 3 is a perspective of the supplementary rubber inverted. Fig. 4 is a longitudinal section of the supplementary rubber, and Fig. 5 is a cross-section thereof on the line $x\ x$.

In carrying out my invention I employ the usual rectangular clothes or fabric receptacle, A, with a semicircular ribbed or corrugated zinc bottom, $a$, its concaved surface being presented upward. To this receptacle are also affixed suitable legs, $b$, and two upright parallel standards, $c\ c$, within the upper ends of which is journaled a cross bar or shaft, $d$, the function of which will presently be seen.

B is the principal rubber between the connected-together side bars or standards B', comprising a fluted or corrugated cylinder, $B^2$, which constitutes the rubber proper. The lower ends of the side bars B' are reduced or recessed, as at $e\ e$, the purpose of which will appear further on. The side bars or standards B' pass through apertures in the cross bar or shaft $d$ near their upper ends, and are provided with springs $f$ above said shaft, said springs being pinned to the standards or bars B', and bearing upon the shaft, their function being to automatically elevate the cylinder $B^2$ above the corrugated bottom $a$ of the receptacle A when pressure is removed from the cylinder after washing. This rubber is weighted, and its ribs or corrugations are made heavy or of comparatively large size, as it is designed to wash heavy or coarse fabrics or articles.

C is the supplementary or auxiliary rubber, which consists, principally, of a shallow concavo-convex board, with its convex surface armed with a finely corrugated or fluted zinc plate and its side bars recessed or grooved, as at $z$, to permit it to be readily slid on or removed from the lower reduced ends, $e\ e$, of the standards or side bars B' of the principal rubber B, the function of said supplementary rubber being to wash light or fine fabrics.

Having thus fully described my invention, I claim and desire to secure by Letters Patent—

1. In a washing-machine, the principal rubber, with a fluted or corrugated surface, a supporting-frame for the same, having its side bars or standards provided with downward-extended projections below the said rubber, in combination with the supplementary rubber, with its side bars provided with grooves or recesses and its convex side finely corrugated or fluted, substantially as and for the purpose set forth.

2. In a washing-machine, the combination of the rubber B, the supporting-frame for the same, having recessed side bars $e$, springs $f$, shaft $d$, receptacle A, having corrugated bottom $a$, and supplementary rubber C, having recessed side bars Z, substantially as shown, and for the purpose described.

In testimony whereof I affix my signature in presence of two witnesses.

JESSE NEWMAN.

Witnesses:
J. L. BEVAN,
H. GOEMANN.